United States Patent
Stamper et al.

(10) Patent No.: US 8,075,404 B2
(45) Date of Patent: Dec. 13, 2011

(54) MULTI-PLAYER GAMING

(75) Inventors: Timothy Stamper, Twycross (GB);
Christoper Stamper, Twycross (GB);
Paul Machacek, Twycross (TW)

(73) Assignee: Microsoft Corporation, Redmond, WA (US)

( * ) Notice: Subject to any disclaimer, the term of this patent is extended or adjusted under 35 U.S.C. 154(b) by 461 days.

(21) Appl. No.: 11/428,469

(22) Filed: Jul. 3, 2006

(65) Prior Publication Data

US 2008/0004117 A1    Jan. 3, 2008

(51) Int. Cl.
*A63F 9/24*    (2006.01)
(52) U.S. Cl. ............................................. 463/42
(58) Field of Classification Search ............ 463/42, 463/40
See application file for complete search history.

(56) References Cited

U.S. PATENT DOCUMENTS

| | | | |
|---|---|---|---|
| 6,629,892 B2* | 10/2003 | Oe et al. | 463/40 |
| 6,908,389 B1* | 6/2005 | Puskala | 463/40 |
| 6,951,516 B1* | 10/2005 | Eguchi et al. | 463/40 |
| 2004/0097287 A1* | 5/2004 | Postrel | 463/41 |
| 2006/0293103 A1* | 12/2006 | Mendelsohn | 463/42 |

OTHER PUBLICATIONS

Yahoo Games, Invite or Boot, Accessed Jan. 29, 2009.*

* cited by examiner

*Primary Examiner* — Omkar Deodhar
(74) *Attorney, Agent, or Firm* — Lee & Hayes, PLLC (57) ABSTRACT

A method of enabling the playing of a game is described in which an electronic message requesting assistance is sent during a game being played by a gamer. Assistance is provided for a portion of the game in the form of an additional character in the game.

19 Claims, 8 Drawing Sheets

MULTI-PLAYER GAMING

BACKGROUND

Games consoles, such as Xbox 360™, have been developed which enable a gamer to play games on their own (single player games) or games with other gamers over a network (multi-player games). Typically the software for running the game resides on the individual games consoles, although for multi-player games, the game play may be controlled by a server, in particular where the gamers are using different games consoles rather than different controllers connected to the same console. Games may be available to play either as a single player or as a multi-player game and whether it is a single or multiplayer game (and usually also the number of players participating in a game) is established prior to the commencement of game play.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A method of enabling the playing of a game is described in which an electronic message requesting assistance is sent during a game being played by a gamer. Assistance is provided for a portion of the game in the form of an additional character in the game.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
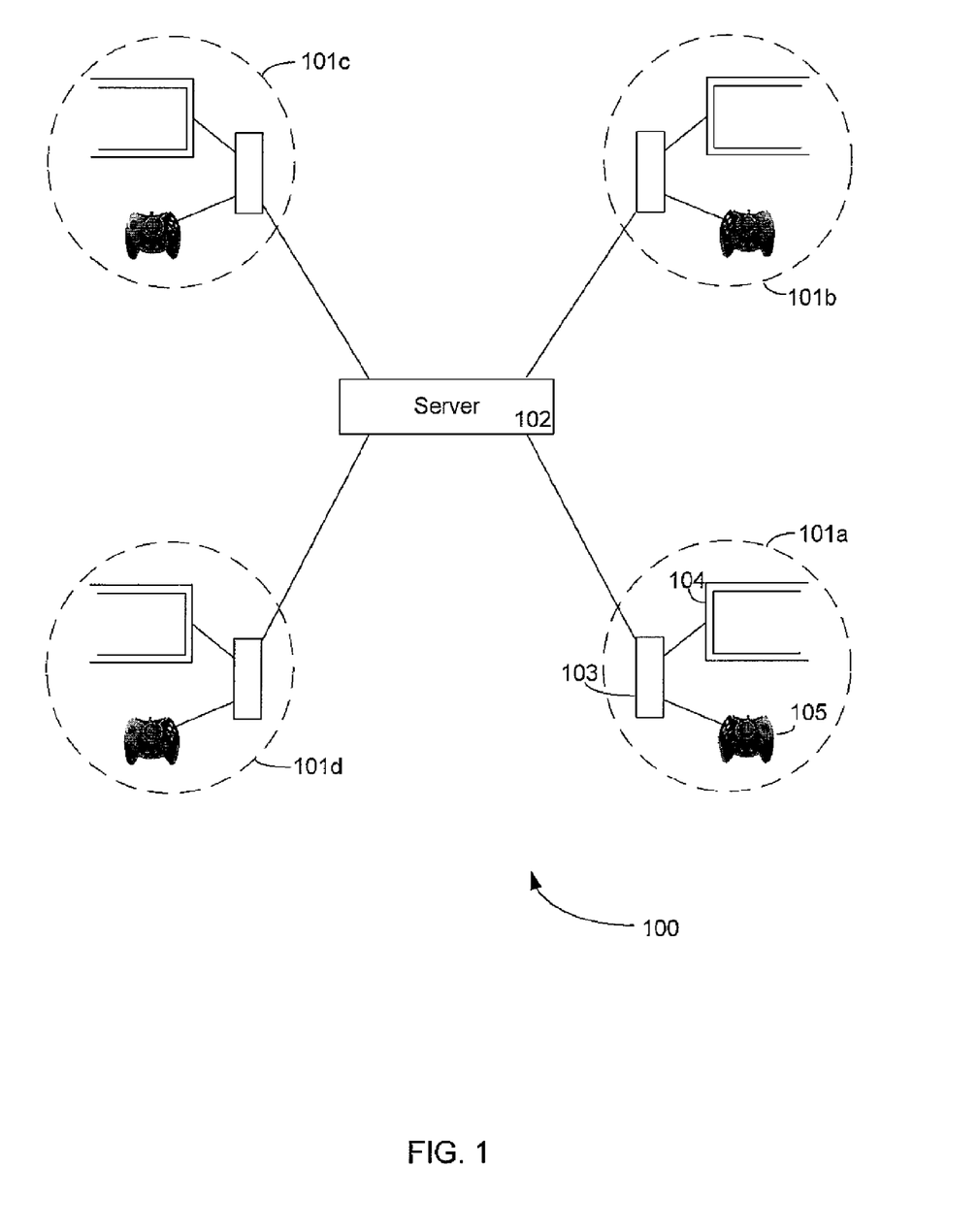
FIG. 1 is a schematic diagram of a network of gaming devices.

FIG. 1 is a schematic diagram of a network 100 of gaming devices. The network comprises four gaming devices 101a-d (e.g. Xbox 360™) connected together via a server 102 (e.g. an Xbox Live® Server). Each gaming device comprises a console 103, a display 104 and a controller 105. The connections may be wired or wireless, direct or indirect (e.g. over the internet). It will be appreciated that a network may comprise more or fewer devices and that each device may have one or more controllers connected to it, with different garners using different controllers to play the same game.

Figure 2:
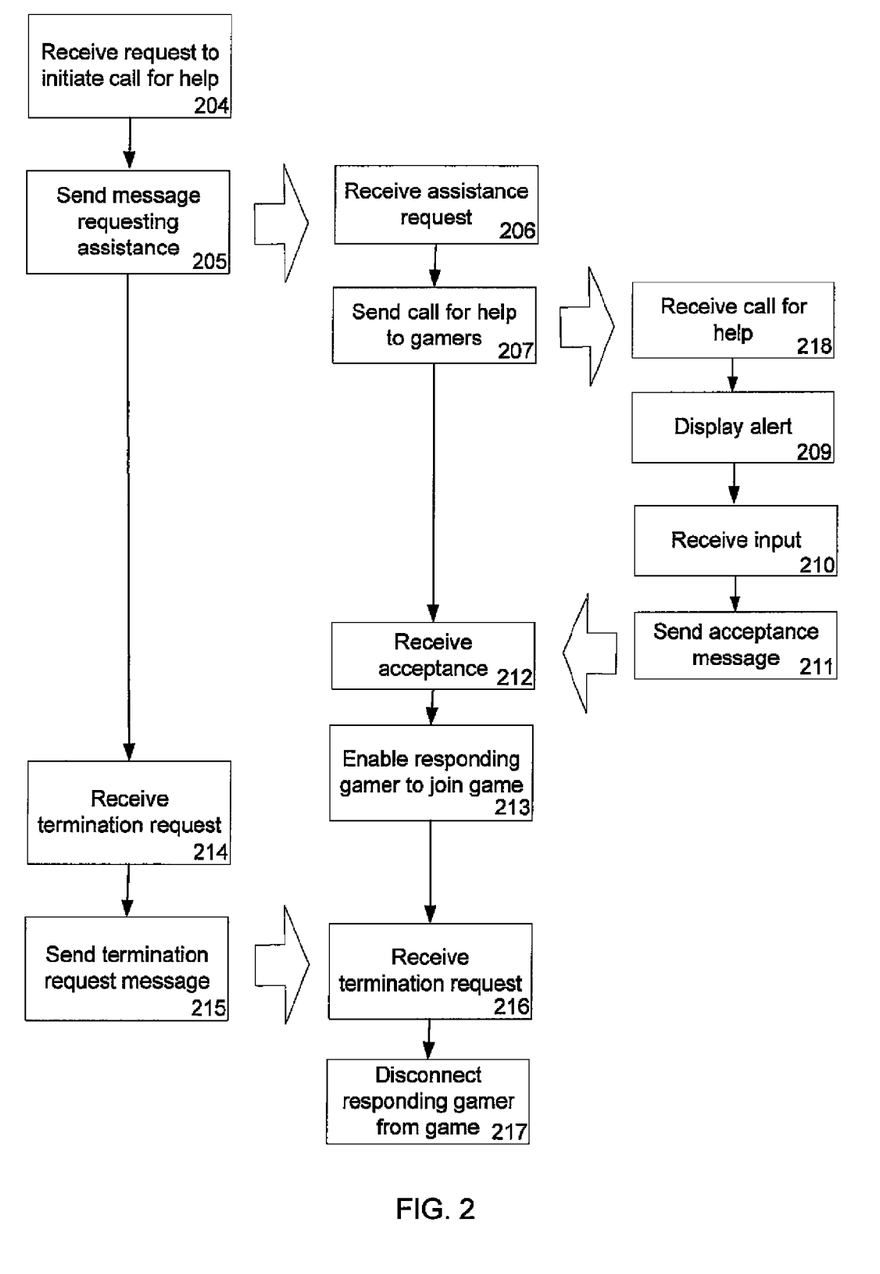
FIG. 2 shows example flow diagrams of the call for help process.

In a first example, if a gamer wants to play a single player game they may do so using a gaming device 101a. This single player game may be of any type, including, but not limited to a role playing game, an action game, a first person shooter etc. The gamer may, however, reach a stage in the game where they require some assistance (e.g. to complete a level, capture an object, defeat an enemy etc). The gamer therefore initiates a call for help and example flow diagrams of the call for help process are shown in FIG. 2. The call for help may be initiated during game play or whilst game play is paused. The call may be initiated from within the game or externally to the game, as described in more detail below.

FIG. 2 shows three flow diagrams 201-203 showing the process steps occurring at the initiating gaming device (flow diagram 201), the game controlling entity (flow diagram 202) which may be the server 102 and the responding device (flow diagram 203), which may be another gaming device 101b. The initiating gaming device 101a receives a request to initiate a call for help (step 204). This request may be initiated by a gamer playing on the gaming device, e.g. by pushing a particular button on the controller or clicking on a button shown on the display etc. Having received the request, the device sends a message to the controlling entity requesting assistance (step 205) and this message is received by that controlling entity (step 206). The receipt of this message acts as a trigger to cause the entity to send a call for help message to other garners (step 207). This call for help message may be received by a device associated with one of those gamers (step 208) and an alert may be displayed (or otherwise indicated) on the device (step 209). Using an input device (such as a keyboard, keypad, mouse etc) a gamer may indicate an acceptance of the call for help. If the device receives such an input (step 210), it sends an acceptance message back to the controlling entity (step 211). The controlling entity receives the acceptance message (step 212) and enables the relevant gamer and their associated gaming device 101b to join the game being played by the first gamer (step 213). The responding gamer joins the game at the same point in the game play as the first gamer (i.e. at the same point in time) and may join at the same position in the game world as the first gamer (e.g. the responding gamer's character appears next to the first gamer's character in the game world) or elsewhere within the game world (e.g. as a spy behind enemy lines, or in the same building as the first gamer but at a different position to the first gamer so they can help the first gamer's character escape etc). Having joined the game, the additional gamer is now able to assist the first gamer in the particular stage in the game where they requested assistance.

Subsequently, the garner may complete the stage where they required assistance and/or decide that they no longer require assistance and therefore may initiate the termination of the call for help. The gaming device 101a therefore receives a termination request (step 214) and therefore sends a termination request message to the controlling entity (step 215). Upon receipt of the termination request message (in step 216), the controlling entity disconnects the responding gamer (and their associated gaming device) from the game (step 217). The receipt of the termination request (in step 216) therefore can be considered as the trigger for the disconnection of the responding gamer (and their associated gaming device). In other examples the triggers may be different (as described below). The game then returns to the single player mode as was running prior to the initiation of the call for help. A further call for help may be initiated subsequently and the process shown in FIG. 2 repeated. The individual steps in this method are described in more detail below.

By enabling a third party to join in the game for a particular portion of the game, the game changes from a single player game to a multi-player game for a limited period of time. The maximum length of this limited period of time is controlled by the original gamer because they can initiate the disconnection of any responding gamer from the game.

The call for help may be initiated by a gamer from within the game, for example by using a dedicated button (e.g. a large/red "panic/help" button) on the device's controller or a predefined key stroke, by use of a special feature within the game (e.g. by interacting with a special character or object within the game) or by another defined mechanism. The keystroke or special feature may be user-defined within the game or may be defined by the user for use across multiple games. A graphical user interface may be used to define this keystroke/special feature etc. In an example, the call for help may be initiated by kicking a signpost within the game or by asking a special character for help. Other examples and aspects of initiating the call for help are described below.

The call for help mechanism may be a context sensitive system whereby a particular input is not set-aside permanently, but becomes available at times that the gamer may be allowed to call for help, or at times when the software decides that the gamer may need help. This change in context may or may not be displayed or indicated to the gamer in some way. Where a dedicated button is used and where it is only permitted to call for help at certain times or under specific conditions, this may be made obvious with a visual cue; i.e. the button could be internally illuminated when it is active for use.

For gaming devices with a touch screen input, the call for help may be initiated by the gamer touching a panic/help "icon" or "image" to trigger the call. Again, this "icon" could be a permanent feature on the screen throughout play, or may only appear when the context for use is met.

In another example, voice recognition technology may be used on a gaming device that is enabled to listen to the gamer's voice (either through a headset or a built in microphone of its own). The software may recognize the gamer shouting the word "help" or any other defined cue word, at which point it may initiate the call for help. This cue word might be selected from a fixed list of possible words by the software developer, or could be word(s) that the gamer has previously selected to use, possibly by teaching them to the device.

Although the above description relates to a request for a call for help being initiated by a gamer (prior to step 204), it may alternatively be initiated by the game itself. In such an example, the responding gamer may join the game to oppose the gamer playing the single player game (e.g. as an enemy or opponent). The original gamer may then not be aware whether they are playing against the gaming device or against another gamer. Such a request for a call for help may be initiated by the game in response to predefined trigger conditions such as attainment of a high level in a game by the gamer, rapid progress through a game etc.

In another example, the request for a call for help may be initiated by the game itself and the responding gamer may join the game to assist the gamer playing the single player game. For example, such a request may be triggered by:
- A situation where a gamer has had a number of attempts to complete a portion of a game without success.
- A situation where a gamer is close to losing a fight
- A situation where two or more gamers are required to complete a task
- The specific situation within the game, e.g. in a game there might be a jeep with a large gun mounted on the back. To use this vehicle successfully it takes 2 people. If the game character controlled by the gamer climbs into the drivers seat then the system may automatically puts out a call for help for someone to man the gun and defend the vehicle. However, if the character climbs onto the back to operate the gun then a call for help for a driver could automatically be put out. The jeep won't go anywhere until the driver has joined and the gamer may be able to communicate with the driver to say where they wish to go. It might be the case that the driver is killed by someone in which case the jeep will stop, but the system could automatically put out another call for help for a replacement driver.

In another example, such trigger conditions may cause a window to be displayed to the gamer (on the display device of the gaming device) asking them if they wish to request assistance at this point in the game. This automatic call for help initiated by the game may be a feature which can be enabled/disabled by the gamer (e.g. within the options for a game or within their gamer profile).

The request to initiate the call for help, received by the initiating gaming device 101*a* (in step 204), may therefore be received from a gamer using the gaming device 101*a*, the controlling entity (e.g. the server 102) or from the game itself.

Figure 3:
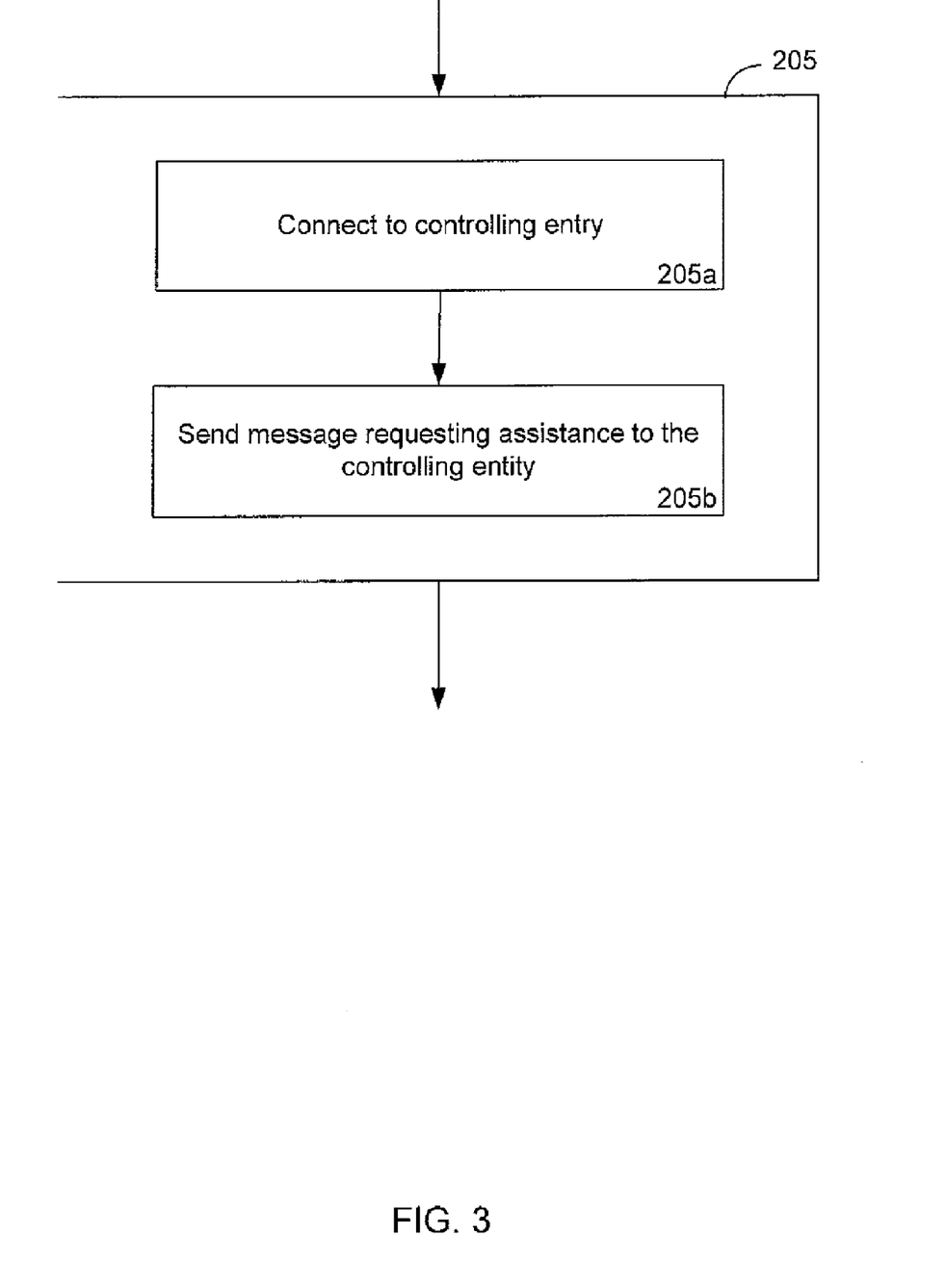
FIGS. 3 and 4 are example flow diagrams showing steps of FIG. 2 in more detail.

The single player game being played on the initiating gaming device 101*a*, may be being played independently from any controlling entity (e.g. server 102). Consequently, the step of sending a message requesting assistance (step 205) may first comprise connecting to the controlling entity (step 205*a*) and then sending the message (step 205*b*), as shown in FIG. 3.

The message sent to the controlling entity (in step 205) may include one or more of the following pieces of information:
- the game being played
- the gamertag (or other ID) associated with the gamer playing the game
- the portion of the game where assistance is required (e.g. mission/level information)
- position of the gamer in the game world
- coded information to enable the recipient to join the game in the right position
- the type of help requested, where more than one option is available (e.g. advice only, additional character only etc)

Alternatively, some or all of this information may already be available at the controlling entity and therefore it may not be necessary to include some or all of this information within the message. The message sent from the controlling entity to other gamers (in step 207) may include some or all of the information listed above (which may have also been included in the message sent to the controlling entity or may already have been known at the controlling entity). Such information may be used by a potential respondent gamer to decide whether to offer to assist or not.

The call for help sent out to other garners (in step 207) may be sent to one or more other gamers. These gamers may not be known to the initiating gamer. The gamers to which the message is sent may be determined according to predetermined criteria such as:

- skill level e.g. within the game or generally within the gaming community (e.g. only experienced gamers)
- level attained within the game e.g. the gamer may need to have already successfully negotiated the particular section or a particular level of the game before being considered suitable to assist in response to a call for help
- levels attained by the initiating gamer (e.g. skill levels, feedback levels etc). For example, a call for help message may only be sent to gamers with similar ratings to the initiating gamer.
- feature set held by the gaming device/gamer e.g. gamers with a particular weapon/vehicle etc.
- the abilities of a gamer's character (e.g. medic, warrior etc).
- indication of willingness to respond
- previous experience of responding e.g. using a feedback mechanism and/or a reward system for responding (e.g. if the feedback for a gamer fell below a threshold, they may need to "requalify" to be eligible to help)
- preferences set by the initiating gamer e.g. a blocked list for gamers they do not permit to assist them, preference to those gamers included in their 'friends list' etc
- preferences set by potential respondent gamers e.g. which games they are prepared to assist another gamer in, what roles they are prepared to perform (e.g. medic, warrior etc), what situations they are prepared to assist in etc.
- current activity of the potential respondent (e.g. available/busy etc or playing the same game). For example, the message may only be sent to gamers who are already playing the same game.

The message calling for help (sent in step 207) may be sent to other gaming devices and/or other devices such as mobile telephones (e.g. via SMS), computers (e.g. via email or instant messenger) etc. The device by which a potential respondent gamer is alerted about the request for help may be determined by preferences set by them in a profile (e.g. using a graphical user interface). The message may be in the form of a textual message (e.g. via SMS), an audio message (e.g. an audio file), a video message or any other form of electronic messaging.

The message calling for help you may include a snapshot picture of the initiating gamer's current situation or a feature or some other aspect that the gamer wishes to highlight along with the call. The message may be received by other gamers as a Picture-in-Picture message e.g. whilst they're playing another game (or the same game) or on another device type (e.g. on a mobile phone).

The message calling for help may include a "help" message previously recorded or otherwise prepared by the initiating gamer (e.g. an audio and/or visual message).

Where the message calling for help (sent in step 207) is sent to a device associated with a gamer but which is not their gaming device (or not the gaming device on which they would provide assistance), the message may include a code or other reference to enable them to join the game on their gaming device. For example, the message (of step 207) may be sent to one or more gamers by SMS (Short Message Service) message and may include an alpha-numeric reference (e.g. a six digit number or the username of the initiating gamer). The gamers may respond to the call for help by SMS or other means (e.g. via their gaming device). In order to send this response from their gaming device and/or to join the game, it may be necessary to input the code or other reference included in the initial SMS message. This may ensure that the response is correctly associated with the call for help and that the respondent gamer joins the right game in the right place (e.g. at the same point in the game play and at the right position in the game world, be that at the same position as the initiating gamer's character or elsewhere). In another example, this reference may not be provided in the initial call for help, but instead a subsequent message may be sent once the offer of assistance is accepted (e.g. as part of step 213) to enable the respondent gamer to join the game.

The call for help may be sent to any number of other gamers and the number of gamers to which the call is sent may be limited by the initiating gamer, the game or the controlling entity. Similarly, the maximum number of gamers who are able to join the game to assist the initiating gamer (in step 213) may be limited. For example, the game may define that only one gamer may assist or the maximum number of gamers that may assist may be fixed or variable according to other parameters such as skill level, service/subscription level etc.

The acceptance message sent from the respondent's device to the controlling entity (in step 211) may include details relating to the respondent gamer (e.g. their name, gamertag, gaming device ID etc). This information may be used to enable the gaming device and gamer to be connected into the game play (in step 213) and also to subsequently enable the disconnection of the gaming device from the game play (in step 217). For example, where the acceptance message is sent from a device which is not their gaming device (e.g. from their mobile telephone), the information in the acceptance message may be used to send subsequent data to their gaming device such that the gaming device is prepared and ready for the start of game play. For example, when the responding gamer turns on their gaming device, the correct game may automatically be launched and ready to start.

In some examples, the call for help may be responded to by the controlling entity or the initiating gaming device in addition to or instead of other gamers. For example, artificial intelligence (AI) bots or non playable characters (NPCs) may be introduced into the game (in step 213) to assist the initiating gamer with the relevant section of the game. Alternatively, where the call is initiated by the game (rather than the gamer), the AI bots may be introduced to the game to work against the gamer for the particular section of the game (as described above). The data associated with the AI bots may be transmitted to the initiating gaming device such that the AI bots are running on the initiating gaming device or alternatively, the AI bots may run on the controlling entity with data relating to the bots being transmitted to the initiating gaming device to ensure that they are correctly displayed.

In addition to, or instead of, filtering those gaming devices to which the call for help is transmitted, criteria such as those listed above and/or information included in the acceptance message (as detailed above) may be used to filter the acceptances received (in step 212) prior to enabling responding gamers to join the game (in step 213). Where there is a limit on the number of gaming devices which can be connected to the game in order to provide assistance, these criteria and/or other information may be used to select which of the respondents are enabled to join the game (e.g. selection of the most skilled respondents or the respondents with the best feedback etc). In another example, text or voice chat between the initiating gamer and the respondent gamers may enable the initiating gamer to decide which of the respondents are enabled to join the game.

When a gaming device can join the game (in step 213) or when a call for help can be initiated (prior to step 204) may be restricted, for example to points in the game play where another player can logically join. A game may only allow a gamer to call for help at key moments in the gameplay; i.e. when they reach a specific obstacle or when a specific task needs to be accomplished, or when the gamer's character is injured more than a certain degree. Where the call is initiated because the character is injured, the call may be targeted at players who have "healing" powers, or are medics within the game world. The receiving players help may, therefore, only be very short, and it will be in context with the gamer's situation.

Figure 4:
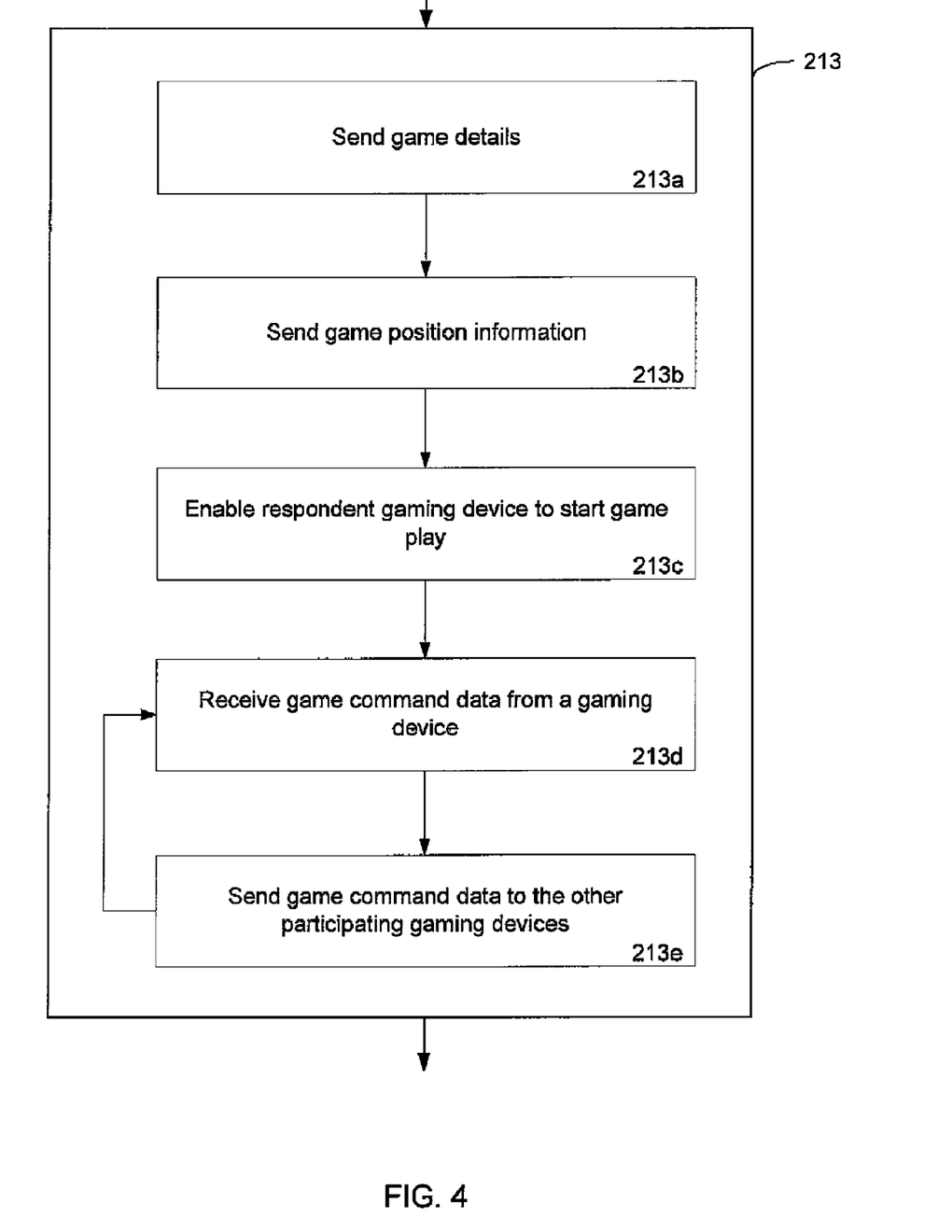

Joining of the game by the respondent gaming device (in step 213) may require additional communication between the controlling entity and the respondent gaming device. An example flow diagram for this step in more detail is shown in FIG. 4. Details relating to the game are sent to the respondent gaming device (step 213a) along with game position information (step 213b) to enable a character controlled by the respondent gaming device to join in the same point in the game play and in some examples at the same position in the game world as the character controlled by the initiating gaming device. The controlling entity then starts the game play involvement of the respondent gaming device (step 213c) and as part of the game play the controlling entity will receive game command data from both the initiating and the respondent gaming devices which will need to be forwarded to the other gaming devices participating in the game play to ensure synchronicity between the gaming devices and such that the game is displayed correctly on all gaming devices involved in the game play. Therefore in response to receiving such a command from one of the gaming devices (step 213d), that command is sent to the other gaming devices in the game play (step 213e) and this process (steps 213d-e) is repeated for all game command data received.

Figure 5:
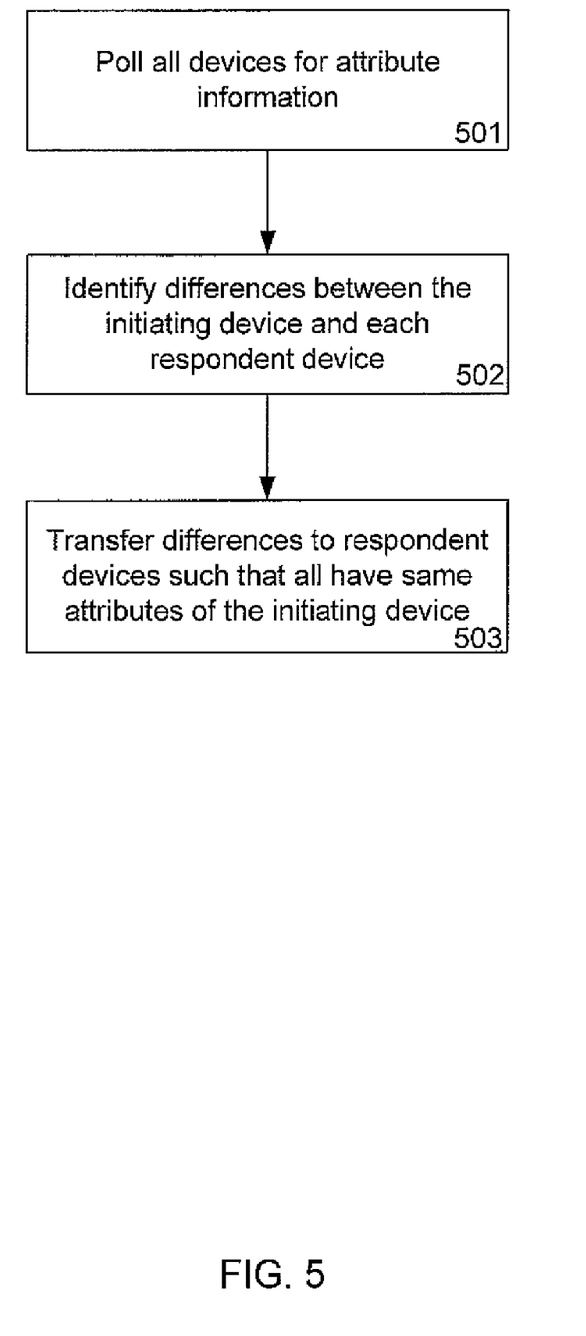
FIG. 5 shows an example flow diagram of a method of transferring feature data between gaming devices.

In order to join the game, it may be necessary to check the feature set of the respondent gaming device to ensure that it is compatible with the initiating gaming device. Where the two feature sets are found to be incompatible, for example, if the respondent gaming device does not own the level of the game which is being played by the initiating gamer, the respondent gaming device may be blocked from joining the game. In another example, feature data may be transferred between gaming devices, for example as described in co-pending U.S. patent application Ser. No. 11/425,258, entitled 'Transfer of Features Between Gaming Devices', filed on 20 Jun. 2006, which is incorporated herein by reference. An overview of the method described in this application as applied in this example is shown in FIG. 5. Having received acceptance messages from a respondent gaming device (in step 212), the controlling entity polls the respondent gaming device for attribute information pertaining to the game in question (step 501). The initiating gaming device is also polled for attribute information if this information is not already held at the controlling entity. The attribute information may include details of levels, weapons, avatars and other features of the game. Having received the attribute information, the controlling entity determines the differences in feature sets held by each of the respondent devices compared to the initiating device (step 502) and transfers the required features to each respondent device such that they have all the features held by the initiating device (step 503).

When an additional character joins the game play they may just appear or alternatively, their entry may be controlled to reduce the disturbance of the illusion of the game environment. In a first example, the game may only permit calls for help to be initiated at particular moments in the game play (e.g. upon reaching particular points or obstacles). The environment at those particular moments may be arranged to provide an entry point for the additional character(s) such as a doorway by which they can enter. In another example, the additional character may join the game play at a distance from the initiating gamer's character and then approach them. In another example, the additional character may arrive in a vehicle (e.g. a car, a helicopter etc).

Where the additional character joins at a position in the game world which is different to the position of the initiating gamer and where that position is not visible by the initiating gamer, the additional character may just appear as this will not disturb the illusion of the game environment for the initiating gamer.

Another method could be that they appear as a "ghost" where their avatar may appear as an apparition that could join in when necessary, but then drift off again when the helper leaves. This "ghost" may be able to directly help the gamer (i.e. fight a monster or drive a vehicle) but they may also just be there as a physical presence, and the help you the gamer receives is from the information/advice that the avatar's owner gives them through voice chat or text chat. In another example, the joining player doesn't physically join the game world, but can enter it with a viewpoint (that they may be able to control) and they can see something that the calling player can't. So for instance the gamer's character might be stuck in a WW1 trench and the gamer may call for help. The helping player joins the game and can move their ghost around, or just fly their viewpoint camera around to act as a spy and look at what the enemies in an opposing trench are doing. The helper could talk/text to the gamer the spy information and then leave the game again, at which point the gamer may act on this information.

The process by which the additional character joins the game play may be an automatic and autonomous operation such that the joining gamer has no control over their character until it is fully delivered. Prior to being fully delivered, the character may be under the control of one of the gaming devices or a game controlling entity (e.g. a gaming server).

Instead of polling attributes and determining whether a respondent gaming device is suitable, as described above, the attribute information may already be stored at the controlling entity and this information may be used to determine which gamers receive the call for help (in steps 207-208). For example, the controlling entity may only send the call for help message (in step 207) to those gamers with a feature set which includes all the features held by the initiating gaming device. This ensures that there will not be a feature mismatch which might affect the assistance provided and eliminates the need for feature transfer as described above and shown in FIG. 5.

The termination of the connection of the respondent gaming device may be initiated by the respondent gamer (e.g. when they wish to stop playing or when they disconnect or switch off their gaming device), by the game (e.g. when the section/stage/level is completed) or by the original gamer. Where the termination is initiated by the respondent gamer, the termination request will be received by the controlling entity (in step 216) from the respondent gaming device (not shown in FIG. 2). Where the termination is initiated by the game or the original gamer, the termination request will be received by the initiating gaming device 101a (in step 214) and subsequently communicated to the controlling entity (steps 215-216). The termination request received (in step 214) may relate to all those gaming devices providing assistance or to only a subset of those gaming devices.

Where the termination is triggered by the initiating gamer or the respondent gamer, any suitable trigger mechanism may be used by the gamer including dedicated controls, keystrokes, menu features etc (as discussed above in relation to triggers for calling for help as used by the initiating gamer).

In an example, criteria may be defined within the game that determine when the termination is initiated by the game. This may include specific achievements that must be achieved within a particular time period in order that the connection of the respondent gaming device is not terminated or specific achievements that trigger the termination of the respondent gaming device.

In FIG. 2 the disconnection of the respondent gaming device is performed by the controlling entity (in step 217) in response to one of the triggers described above. However, in another example, the original gaming device 101a may revert back to the single player operation (e.g. by ignoring any game commands received from controlling entity) in parallel with sending the termination request to the controlling entity to cause the respondent gamer (and gaming device 101b) to be disconnected.

When the additional character leaves the game play they may just disappear or alternatively, their departure may be controlled to reduce the disturbance of the illusion of the game environment. In an example, the character may leave through a suitable doorway or move out of sight before disappearing (e.g. by moving behind an obstacle or by moving a distance away from the gamer's character so that they can no longer be seen). In another example, in a similar manner to joining the game, the additional character may be collected in a vehicle (e.g. the same vehicle that they arrived in).

As described above in relation to joining the game, the leaving operation may be automatic and autonomous such that once the gamer initiates the leaving process, the character is controlled by a gaming device (or game controlling entity) and not by the respondent gamer (e.g. as they walk over to a drop zone, duck when the helicopter lands and jump on board).

Once a respondent gaming device's involvement has been terminated (or before termination), the respondent gamer may be presented with any other available scenarios where there help is required.

After the disconnection of the respondent gaming device (e.g. in step 217) and at a suitable point (e.g. at the end of the game, the end of the level, when the game is paused etc), the initiating gamer may be presented with a graphical user interface (GUI) by their gaming device requesting feedback on the respondent gamer. The feedback received by the gaming device may be transmitted to the controlling entity and/or stored at the gaming device and this information may subsequently be used to determine whether the particular respondent gamer is permitted to assist the initiating gamer (or other gamers) in the future (as described above). This may enable a gamer to block another gamer from providing assistance to them (or to any gamer) in the future. Where assistance is terminated early and this is initiated by the initiating gamer, this may be automatically considered negative feedback for the respondent gamer who's game play is terminated. Use of such a feedback system enables the call for help process to be self-policing such that malicious respondents or inexperienced respondents who hinder the situation can be blocked or otherwise not selected in the future.

Additionally (or instead) the GUI may enable the gamer to decide whether any of the gamers that provided assistance should be added to the initiating gamer's friends list. Use of the friends list and blocked list information may be used to automatically provide feedback information with a rating system for a gamer based on how may friends and blocked lists a gamer appears on.

A rewards system may be implemented by the controlling entity to encourage gamers to assist others when required. Rewards may be allocated to gamers for responding to the calls for help and/or for positive feedback relating to their assistance. Assistance of others may be incorporated as a requirement in some games or within a gaming community (e.g. Xbox Live (trade mark)) to attain high levels of achievement or status. In another example, the reward system may enable gamers who assist others to download features from the controlling entity (e.g. a special object) or obtain other benefits in a game world or within the gaming community (e.g. an award of points). The amount of reward offered may be fixed or may be dependent upon the amount of help given.

In addition to (or instead of) centrally provided rewards, the initiating gamer may offer a reward for help received in the form of money, game features or other valuables.

Although the above description relates to help being provided by one or more additional characters introduced into the game world which are controlled either by another gamer or by a gaming device (e.g. the controlling entity or the initiating gaming device), help may alternatively be provided in other forms, such as providing advice.

In a first example where the help is provided in the form of advice, the responding player may be able to watch the initiating gamer's game play and provide advice on how to achieve a task (e.g. verbally using the chat facility on Xbox Live (trade mark)). To watch progress then they may have a gaming device that plays the same game environment and they could have a camera that follows the initiating gamer's actions. Alternatively, the initiating gaming device (or the controlling entity) may send out an audio and/or video stream which may be played on the respondent gamer's device. This means that the helper could use a mobile phone (for instance) to watch a game being played on a more powerful PC, and also communicate with the calling player to give advice. In an example, the initiating gamer might get to a puzzle that needs to be completed (e.g. the unlocking of a combination lock) and this puzzle could be sent to the responding gamer's device (which could be a very different device like a mobile phone) and appear to them as a mini-game to play. When they have completed the game then it unlocks the lock so that the initiating player can continue through the door, or open the box etc.

In a second example where the help is provided in the form of advice, the respondent gamer may not be able to view the initiating gamer's game play but may instead be connected to the initiating gamer in a manner which enables them to discuss tactics, form a game plan, describe how to progress etc. In such an example, the message sent from the controlling entity to other games may include information on the assistance that is required and may enable a respondent gamer to choose to contact the initiating gamer via voice or text to provide the information needed. This would enable gamers playing one game to provide assistance to others playing the same or a different game without breaking from their game play.

Although the above description relates to a call for help being initiated by a gamer in a single player game, the methods are also applicable to a multi-player game. In a multi-player game, the call for help may be initiated by a gamer to request assistance for that gamer or to request assistance for the team (or other group, such as an army) that the gamer belongs to. In such a situation, those responding to the call for help may join the gamer to form a team working for the benefit of that gamer or may join the team that the gamer already belongs to in order to assist that team.

Although the above description relates to the call being responded to by individual respondent gamers, the call may be responded to by a group of gamers (and hence a group of gaming devices) such that they either all join the game or none of them join the game. In this manner, gamers may group together to provide assistance teams who are willing to assist anyone in a particular game (or for a particular section of a particular game).

The methods described above apply where the game runs on the gaming device and communicates with a central controlling entity, such as a server 102. The methods, however, also apply where the game runs on the central controlling entity with only limited data (e.g. display data and user input data) being transmitted between the central controlling entity and the gaming device.

Figure 6:
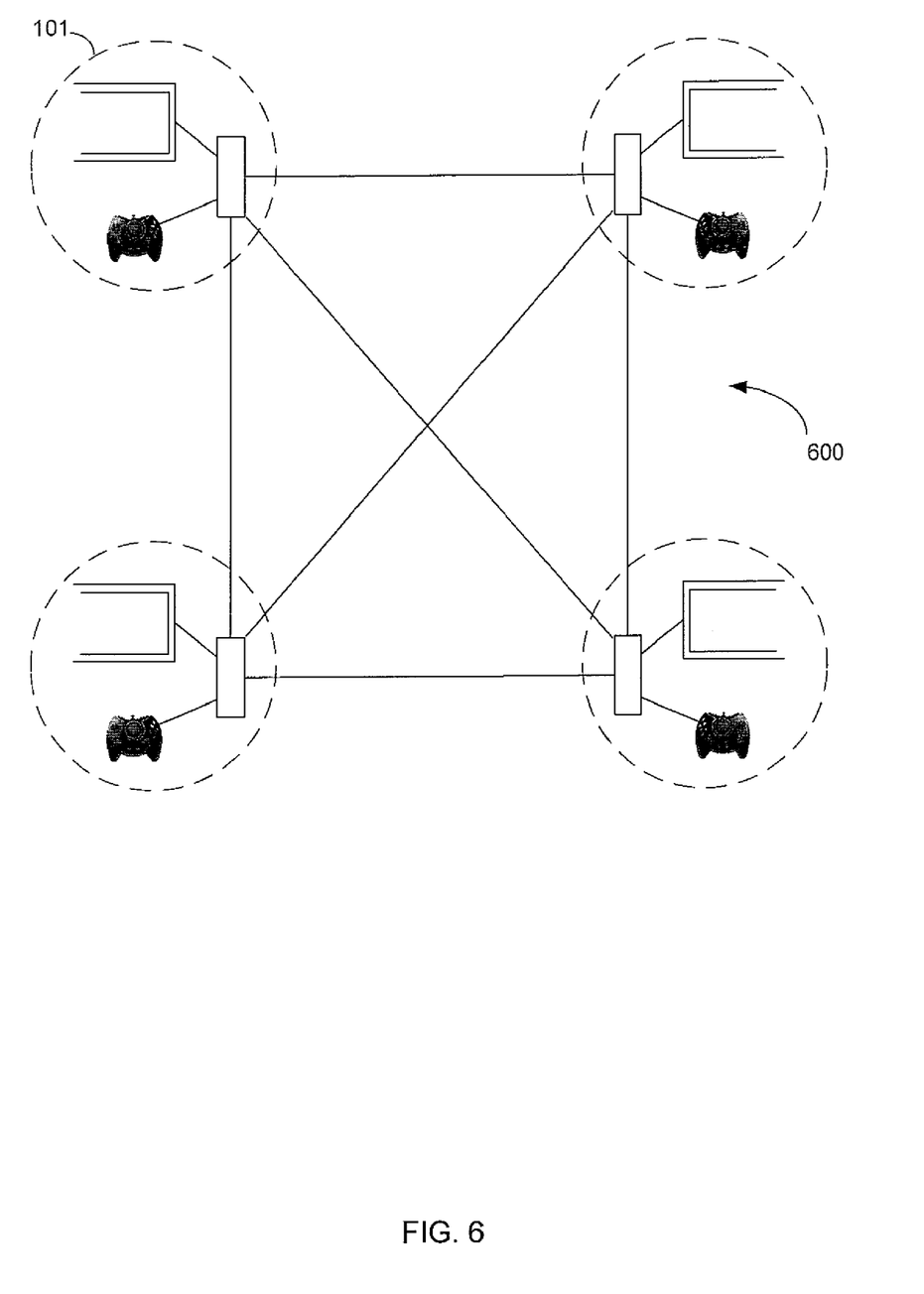
FIG. 6 is a schematic diagram of another network of gaming devices.

The methods described above may also be applied to a network 600 of gaming devices 101 which are inter-connected without control by a server, as shown in FIG. 6. These gaming devices may be connected directly to each other (e.g. via a network, via direct links etc) or may be connected to each other via other intermediate devices (e.g. other gaming devices), for example in a peer-to-peer network. In such a network 600, one of the gaming devices may act as the controlling entity and perform the steps shown in flow diagram 202. A gaming device may be identified at random to act as the controlling entity or the controlling entity may be selected based on predetermined criteria. In another example, the initiating gaming device may also perform the functions of the controlling entity (e.g. steps 204-207, 212-217). In this case the trigger for sending the call for help message (in step 207) may be the request received (in step 204) which, as described above, may come from the game or an input from the gamer.

In an example, there may be a controlling entity (e.g. a central server 102); however the call for help messages may be transmitted to other gaming devices without passing through the entity or without involvement of the controlling entity. Such messages may be transmitted directly between devices (e.g. via a direct connection or a wireless link) or may be transferred via intermediate devices (e.g. over the internet, in an adhoc network of gaming devices in which devices may act as relays etc). In an example, the call for help may be responded to only by gamers using other controllers connected to the same gaming device.

Where there is no central controlling entity, (e.g. no central server 102, as shown in FIG. 6) or where the call for help is not transmitted via that central controlling entity, it may be necessary for additional information (e.g. position information, authentication information etc) to be provided in the messages between the initiating gaming device and the responding gaming device to enable communications to be established between the two devices and to enable the second gaming device to be joined into the game play.

The transmission of messages between entities (e.g. gaming devices, servers, controlling entities and other devices) may be by any suitable medium. For example the communications may be wireless (e.g. via Bluetooth, WiFi, WiMax etc) or over wired connections and the connection between two entities may comprise multiple sections with different media being used over different sections.

Figure 7:
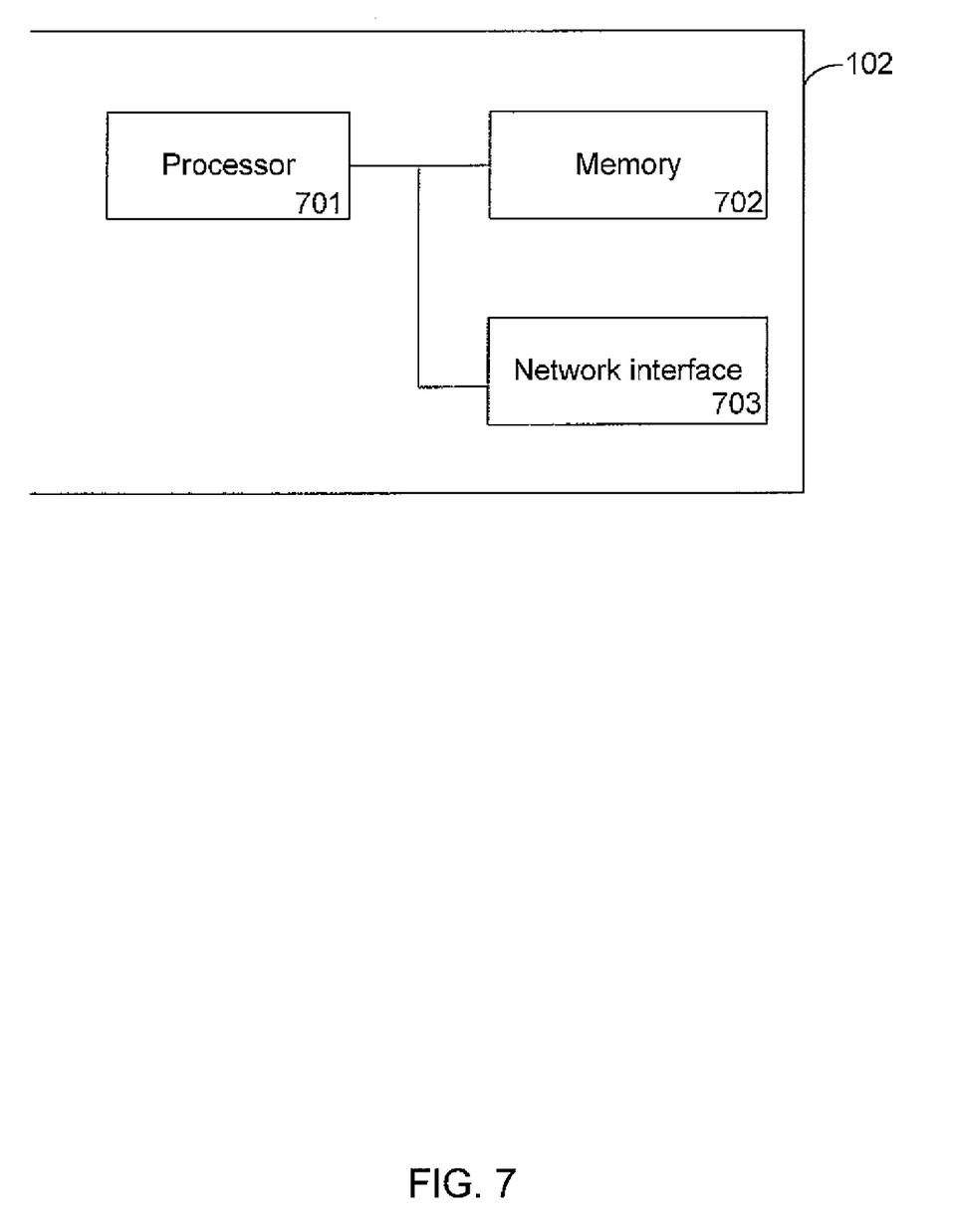
FIG. 7 shows a schematic diagram of a server.
Figure 8:
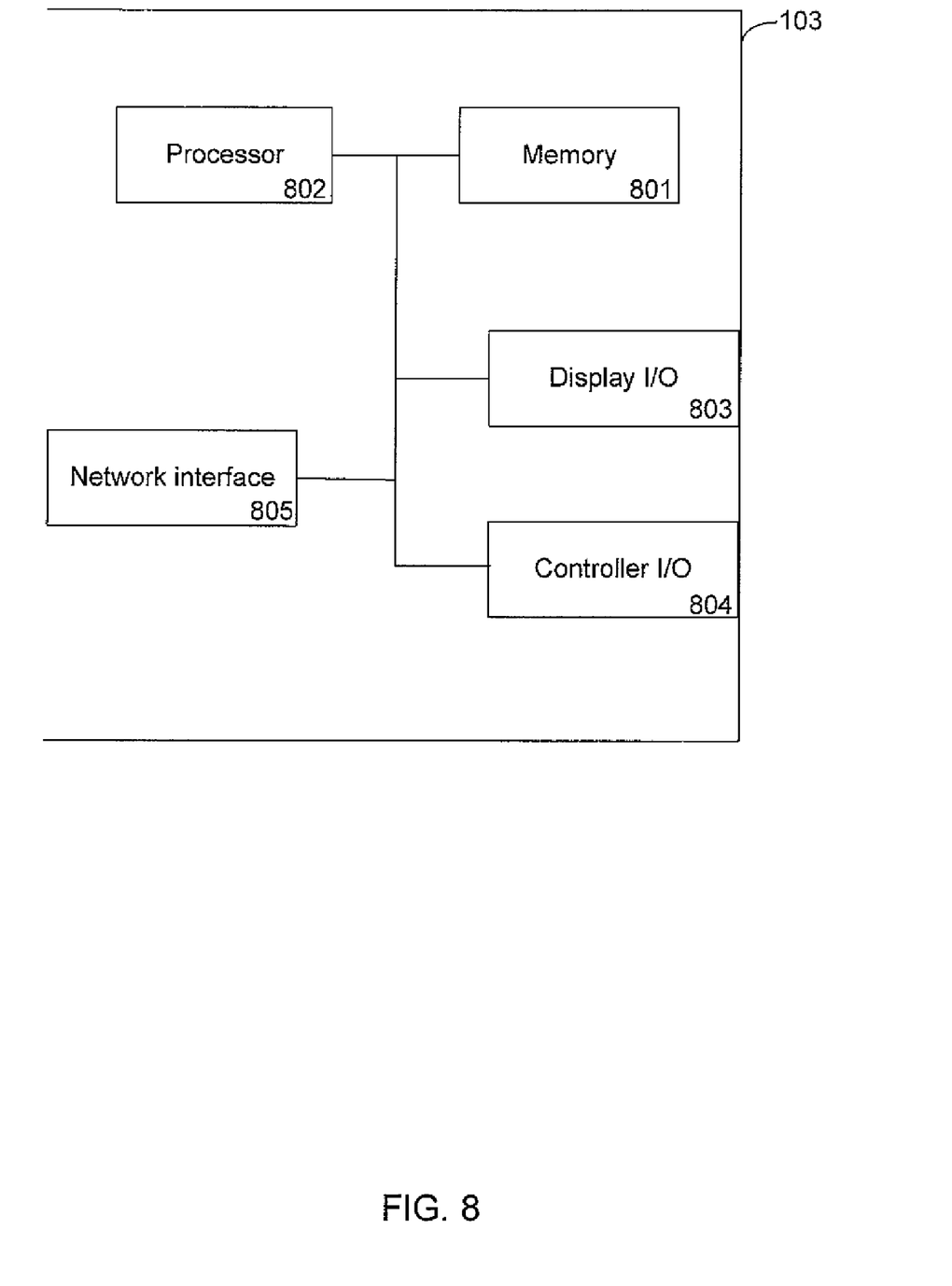
FIG. 8 shows a schematic diagram of a console.

FIGS. 7 and 8 show schematic diagrams of the server 102 and the console 103 in more detail. The server 102 comprises a processor 701, a memory 702 and a network interface 703. The console 103 comprises a processor 802 connected to the memory 801, a display I/O 803, a controller I/O 804 and a network interface 805. The memory in each device is arranged to store executable instructions. These instructions are arranged to cause the processor to execute the methods described above.

A further example provides a graphical user interface comprising one or more of: means for defining a user-specific command for initiating a call for help; means for providing feedback on a gamer following their response to a call for help; and means for defining a device by which a user is contacted about calls for help.

Although the present examples are described and illustrated herein as being implemented in a network of gaming devices, the system described is provided as an example and not a limitation. As those skilled in the art will appreciate, the present examples are suitable for application in a variety of different types of networks. The networks need not be dedicated to gaming and the gaming devices may be able to perform many other functions (as described below).

The terms 'gaming device' and 'gaming console' are used herein to refer to any device on which a user can play a game, including, but not limited to, dedicated games consoles (e.g. Xbox®, Xbox™ etc), computers, PDAs, and mobile telephones. Although the gaming devices shown above comprise a console, a display and a controller, this is by way of example only and it will be appreciated that some/all of the functions may be integrated (e.g. into a handheld gaming device) or that the device may not comprise all the features (e.g. the console may be connected to a television which although used to display the game is not part of the gaming device itself).

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

The steps of the methods described herein may be carried out in any suitable order, or simultaneously where appropriate.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of selectively obtaining assistance during play of a game, the method comprising:
   monitoring progress of a first player during a predefined scene of the game that is played without assistance by other players;
   determining when to offer assistance to the first player based at least in part on the first player's lack of progress during the predefined scene of the game;
   receiving a request for assistance initiated by the first player as a first trigger, the request for assistance including at least one criterion for other players to qualify to provide assistance to the first player;
   sending an electronic message to the other players of the game to request assistance for the predefined scene in the game being played by the first player from a first gaming device, the electronic message including a message and connection information to enable at least one of the other players of the game to provide assistance to the first player during the predefined scene in the game, the electronic message further including the at least one criterion, wherein the sent electronic message is sent in response to the first trigger to a server that facilitates distribution of the electronic message to gaming devices associated with the other players of the game;
   connecting a second player of the game using the connection information, the second player being one of the other players of the game wherein the second player satisfies the at least one criterion;
   receiving assistance for the predefined scene in the game, the received assistance provided by an additional character that is controlled by the second player and actively participates in an action sequence of the game that is shared simultaneously with the first player; and
   disconnecting the second player of the game in response to receipt of a second trigger that is initiated by the first player, the second trigger to terminate the connection to the second gaming device thereby discontinuing the assistance provided by the additional character.

2. A method according to claim 1, further comprising receiving a response message from the second player having a second gaming device in response to the electronic message;
   and wherein connecting the second player includes providing information to the second gaming device such that the game on the second gaming device commences at a same point in the game as outputted to the first player and is outputted in a synchronized manner on both gaming devices, and wherein the second gaming device controls the additional character in the game.

3. A method according to claim 2, further comprising, prior to sending the electronic message to a plurality of devices:
   determining that the first player is eligible for help in the predefined scene based on an eligibility criterion; and
   identifying the plurality of devices, wherein each of the plurality of devices is associated with one of the other players.

4. A method according to claim 1, wherein the at least one criterion is associated with gaming accomplishments of the other players.

5. A method according to claim 2, further comprising, prior to connecting a second gaming device to the first gaming device:
   identifying the second gaming device.

6. A method according to claim 2, wherein each device comprises one of: a gaming device, a mobile telephone, a personal digital assistant and a computer.

7. A method according to claim 2, wherein the game being played by the first player includes a single player game.

8. The method of claim 4, wherein the at least one criterion that is associated with the gaming accomplishments for the other players of the game includes a criterion that the other players have completed the predefined scene in the game.

9. The method of claim 8, wherein the at least one criterion is based on a level attained within the game by the other players.

10. The method of claim 1, further comprising receiving a voice command from the first game, the voice command recognizable by voice recognition to act as the first trigger.

11. The method of claim 1, further comprising providing a reward to the second player after successful assistance of the first player in the portion of the game, the reward to encourage the second player to assist the first player.

12. The method of claim 11, wherein the reward is at least one of game points or unlocking additional features of a game.

13. The method as recited in claim 1, further comprising compiling a list of available and eligible ones of the other players in response to the sending the electronic message; and
   selecting, based at least in part on input from the user, the second player from the available and eligible ones of the other players.

14. One or more computer memory with device-executable instructions which, when executed, cause a computing device to perform operations comprising:
   determining that a first player is eligible to request assistance to complete a portion of a game, the eligibility based at least in part on a threshold number of unsuccessful attempts to complete the portion of the game performed without assistance by other players;
   sending an electronic message to the other players of a game in response to a first trigger that is initiated by a first player, the electronic message to request assistance during a portion of the game being played by the first player from a first gaming device, wherein the electronic message is sent to the other players having associated gaming devices that are in connection with a host server and offers a reward to the other players to provide the assistance, and wherein the host server is configured to receive the electronic message from the first device and distribute the electronic message to the associated gaming devices;
   receiving assistance for the portion of the game, the received assistance provided by an additional character that is controlled by the second player and actively participates in an predefine scene of an action sequence of the game that is shared simultaneously with the first player;

providing the reward to the second player after successfully assisting the first player to complete the action sequence; and discontinuing the received assistance in response to a second trigger initiated by the first player.

15. One or more computer memory according to claim 14, wherein the first trigger is initiated by the first player using a voice command.

16. One or more computer memory according to claim 15, wherein the second trigger is initiated the first player using a second voice command.

17. An apparatus comprising:

a processor; and a memory to store computer-executable instructions that, when executed by the processor, cause the processor to perform acts comprising:

monitoring progress of a first player during a portion of a game that is played without assistance by other players;

determining when to offer assistance to the first player based at least in part on the first player's progress during the portion of the game;

selectively presenting an assistance request option for the first player based at least in part on the determining when to offer assistance;

sending an electronic message to a server that facilitates distribution of the electronic message to gaming devices associated with the other players of the game in response to a selection of the assistance request option by the first player, the electronic message to request assistance during the portion of the game being played by the first player from a first gaming device, the electronic message including a message and connection information to enable at least one of the other players of the game to provide assistance to the first player during the portion of the game;

connecting a second player of the game using the connection information, the second player being one of the other players of the game;

receiving assistance for the portion of the game, the received assistance provided by an additional character that is controlled by the second player and actively participates in an action sequence of the game; and discontinuing the received assistance in response to a termination trigger initiated by the first player.

18. The apparatus of claim 17, wherein the determining is based at least in part on completion of a minimum threshold number of attempts by the first player of the portion of the game without assistance prior to determining to offer assistance to the first player.

19. The apparatus of claim 17, wherein the acts further comprise receiving feedback on the second player's assistance based on the interaction of the second player in the portion of the game, the feedback used to make a subsequent determination on eligibility of the second player to provide assistance.

* * * * *